United States Patent
Petersen et al.

(10) Patent No.: US 9,638,166 B2
(45) Date of Patent: May 2, 2017

(54) METHOD OF MANUFACTURING A WIND TURBINE BLADE COMPRISING TWO MEMBERS BEING JOINED BY ADHESION

(75) Inventors: Leif Kappel Petersen, Lem St. (DK); Henning Schröder, Hvide Sande (DK)

(73) Assignee: Vestas Wind Systems A/S, Aarhus N. (DK)

( * ) Notice: Subject to any disclaimer, the term of this patent is extended or adjusted under 35 U.S.C. 154(b) by 904 days.

(21) Appl. No.: 13/377,370

(22) PCT Filed: Jun. 29, 2010

(86) PCT No.: PCT/DK2010/050171
§ 371 (c)(1),
(2), (4) Date: Jan. 6, 2012

(87) PCT Pub. No.: WO2011/000381
PCT Pub. Date: Jan. 6, 2011

(65) Prior Publication Data
US 2012/0114497 A1 May 10, 2012

Related U.S. Application Data

(60) Provisional application No. 61/221,919, filed on Jun. 30, 2009.

(30) Foreign Application Priority Data

Jun. 30, 2009 (DK) .................................. 2009 70045

(51) Int. Cl.
*F03D 11/00* (2006.01)
*F03D 1/06* (2006.01)
(Continued)

(52) U.S. Cl.
CPC ......... *F03D 1/0683* (2013.01); *F03D 1/0675* (2013.01); *F16B 11/006* (2013.01);
(Continued)

(58) Field of Classification Search
CPC .. F03D 1/0683; F03D 1/0675; F05B 2230/23; B29C 65/4815; B29C 65/483;
(Continued)

(56) References Cited

U.S. PATENT DOCUMENTS 7,208,566 B2 * 4/2007 Mizori ............... C07D 207/452
528/27
7,334,989 B2 * 2/2008 Arelt ................................ 416/2
(Continued)

FOREIGN PATENT DOCUMENTS

| EP | 1310351 A1 | 5/2003 |
| WO | 2006066593 A1 | 6/2006 |
| WO | 2009062507 A2 | 5/2009 |

OTHER PUBLICATIONS

"Rubber Tubing/Silicone Tubing", Aug. 15, 2010, Vanguard Products Corporation, pp. 1-2.*
(Continued)

*Primary Examiner* — Dwayne J White
*Assistant Examiner* — Alexander White
(74) *Attorney, Agent, or Firm* — Wood Herron & Evans LLP

(57) ABSTRACT

The present invention relates to a method of manufacturing a wind turbine blade having a first member with a first joining surface and a second member with a second joining surface. The method includes applying at least one resin barrier to one or both of the joining surfaces, and subsequently locating the first and the second members adjacent each other so that they are joined by the at least one resin barrier. Hereby at least one cavity is formed between the first and second joining surfaces, which cavity is delimited by the at least one resin barrier. Subsequently resin is filled into the (Continued)

at least one cavity, and the resin is cured. The first member may be a blade shell, and the second member may be a blade spar.

10 Claims, 4 Drawing Sheets

(51) Int. Cl.
| | | |
|---|---|---|
| *F16B 11/00* | (2006.01) | |
| *B29C 65/54* | (2006.01) | |
| *B29C 65/48* | (2006.01) | |
| *B29C 65/00* | (2006.01) | |
| *B29L 31/08* | (2006.01) | |

(52) U.S. Cl.
CPC ........ *B29C 65/483* (2013.01); *B29C 65/4815* (2013.01); *B29C 65/542* (2013.01); *B29C 65/544* (2013.01); *B29C 66/1122* (2013.01); *B29C 66/342* (2013.01); *B29C 66/543* (2013.01); *B29C 66/545* (2013.01); *B29L 2031/085* (2013.01); *F05B 2230/23* (2013.01); *Y02E 10/721* (2013.01); *Y02P 70/523* (2015.11)

(58) Field of Classification Search
CPC . B29C 65/542; B29C 65/544; B29C 66/1122; B29C 66/342; B29C 66/543; B29C 66/545; F16B 11/006; B29L 2031/085
USPC ........ 416/224, 226, 229 R, 230, 232, 241 A; 29/889.7, 889.71, 889.72
See application file for complete search history.

(56) References Cited

U.S. PATENT DOCUMENTS

| | | | |
|---|---|---|---|
| 2009/0087318 A1* | 4/2009 | Althoff et al. | ................ 416/226 |
| 2009/0155084 A1 | 6/2009 | Livingston et al. | |
| 2010/0122459 A1* | 5/2010 | Suffield | ........................ 29/889.7 |

OTHER PUBLICATIONS

Danish Patent and Trademark Office, Search Report issued in related Application No. PA 2009 70045 dated Feb. 1, 2010.
European Patent Office, International Search Report and Written Opinion issued in related International application No. PCT/DK2010/050171 dated Apr. 4, 2010.

* cited by examiner

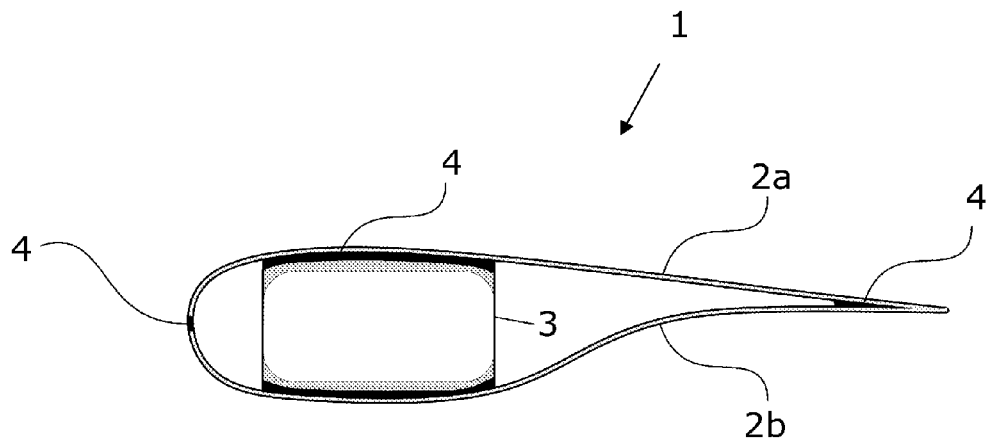
Fig. 1, known art
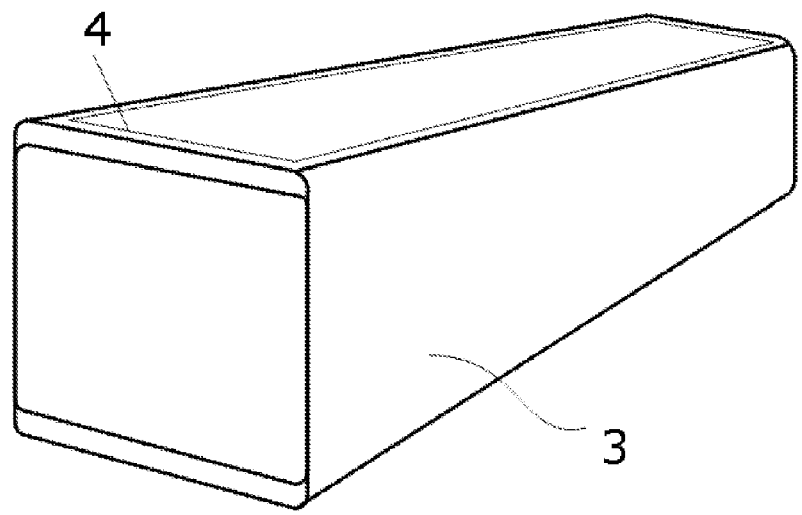
Fig. 2

METHOD OF MANUFACTURING A WIND TURBINE BLADE COMPRISING TWO MEMBERS BEING JOINED BY ADHESION

FIELD OF THE INVENTION

The present invention relates to a method of manufacturing a wind turbine blade, and in particular to a method comprising joining two members by adhesion. The invention further relates to a wind turbine blade manufactured by such a method and to a wind turbine comprising such a blade.

BACKGROUND OF THE INVENTION

A wind turbine blade typically comprises a shell which provides the blade with its aerodynamic properties and a load-carrying spar located inside the shell. The shell and the spar can be manufactured as separate members which are subsequently joined, e.g. by use of a polymer-based structural adhesive. For large blades a large amount of adhesive is applied, typically in the order of several hundred kilograms per blade, and the process is limited by the pumping capacity of the application equipment. The relatively long application time, due to the large amounts of material, means that at least some regions of the adhesive may react with the surroundings before joining which results in film formation at the surface. This may lead to regions with a so-called "kissing bond", i.e. a weak bonding.

Another potential cause of areas with weak bonding is if the geometries of the surfaces to be joined do not completely match. This may result in local distances between the two surfaces being so large that air pockets appear in the adhesive afterwards. This potential cause is particularly related to surfaces with large curvature since the curvature makes it harder to obtain an exact desired geometry.

Weak bonding areas, such as air pockets, may result in a lower stability against buckling, and furthermore they increase the risk of crack initiation and growth.

Furthermore, the adhesive is applied and the members are joined while the shell is still in the mould, and the mould is therefore occupied for longer than the actual manufacturing of the shell itself.

The quality of the bonding is checked afterwards e.g. by ultrasound, and if it is found unsatisfactory, the bondline has to be improved by drilling holes in the shell and injecting additional adhesive after demoulding of the blade to ensure that the final bonding is satisfactory. The need for this additional manufacturing step leads to a less efficient manufacturing method than desired.

Hence, an improved method of manufacturing a wind turbine blade would be advantageous, and in particular a more efficient and/or reliable manufacturing method would be advantageous.

OBJECT OF THE INVENTION

It is an object of the present invention to provide a manufacturing method which is more reliable than a known joining method as described above.

It is a further object of the present invention to provide a manufacturing method which lowers the need for subsequent improvement of the adhesive bond.

It is an object of embodiments of the present invention to provide a method of manufacturing a wind turbine blade by which method the manufacturing capacity can be increased compared to known art.

It is a further object of embodiments of the present invention to lower the cost of the material used for joining compared to known methods.

It is a further object of the present invention to provide an alternative to the known art.

In particular, it may be seen as an object of the present invention to provide a method of manufacturing a wind turbine blade that solves the above mentioned problems of the known art.

SUMMARY OF THE INVENTION

Thus, the above described object and several other objects are intended to be obtained in a first aspect of the invention by providing a method of manufacturing a wind turbine blade having
  a first member with a first joining surface and
  a second member with a second joining surface,
  the first and second joining surfaces being adapted to be joined together, the method comprising
    applying at least one resin barrier to the first joining surface and/or to the second joining surface,
    subsequently locating the first and the second members adjacent each other whereby they are joined by the at least one resin barrier, and so that at least one cavity is formed between the first and second joining surfaces, which cavity is delimited by the at least one resin barrier,
    subsequently filling resin into the at least one cavity, and
    curing the resin.

An advantage of this method is that the at least one cavity between the first and second joining surfaces is filled up even if the distance between the surfaces varies. This is particularly advantageous for curved surfaces, such as double-curved surfaces, which can be difficult to manufacture to have a geometry exactly as specified.

Another advantage compared to a traditional method as described above is that the position of the at least one cavity is known beforehand. Since one point per cavity is enough for filling resin into the cavity, the present method is reliable as the position of the filling point can be part of the design process. With a traditional method, more undesired voids/cavities can arise, and the position thereof is likely to vary from blade to blade. A method according to the present invention is therefore more predictable and reliable than a known method.

The resin barrier may be applied as one continuous resin barrier, such as a string, having curves or bends e.g. to form a closed contour, such as a rectangle. Hereby it may be easier to avoid leaks in the resin barrier and thereby lower the risk of leakage of resin during filling of the cavity. Alternatively, the resin barrier may be applied as a plurality of resin barriers, e.g. to enable use of a relatively simple application tool which only performs linear movements or to increase the manufacturing speed.

The step of filling resin into the at least one cavity may comprise injecting liquid resin. By "liquid" is preferably meant having a viscosity below 3000 mPa·s. This may be done at flow rates in the range of 5 to 500 kg/min to ensure an efficient process and preferably also a complete filling of the at least one cavity. The liquid resin is preferably pumped into the at least one cavity under pressure. In some embodiments of the invention, the injection of resin is assisted by application of vacuum to the cavity to limit or remove the risk of air being trapped in the resin.

The at least one resin barrier may be applied so that one cavity is formed. Hereby it is only necessary to form one connection to the equipment used to fill resin into the cavity, and thereby also only two holes need to be closed afterwards, one for filling in the resin and one for evacuating air. If desired, e.g. for use in visual quality control, more holes may still be made.

Alternatively, the at least one resin barrier may be applied so that a plurality of cavities are formed. Hereby the resin can be filled into a plurality of cavities from more points concurrently whereby the manufacturing time can be lowered. Resin may e.g. be filled into all the cavities at the same time. Furthermore, it may be easier to ensure a complete filling of a smaller cavity, and more than one cavity may therefore be desired even if only one resin injection equipment is available.

Alternatively, one cavity may be filled at a time even when a plurality of cavities are established, e.g. if it is desired to use only one filling equipment.

The steps of applying at least one resin barrier and locating the first and the second members adjacent each other may be performed while the first member is still in a mould used during manufacturing of the first member, and the first member may be removed from the mould before performing the step of filling resin into the at least one cavity. Hereby the mould is occupied by the first member for a shorter period of time than in the known art, whereby the manufacturing efficiency can be improved. This is due to the fact that the known process of applying adhesive is a relatively slow process—compared to injection of resin into a cavity—which process is limited by the pumping capacity of the equipment and the amount of adhesive to be applied.

Another advantage of the shorter time for application of a resin barrier is that the risk of "kissing bonding" as described above is lowered.

The step of filling resin into the cavity may be performed with the first and second joining surfaces in a substantially vertical position. Hereby gravity can be utilized to ensure a uniform and complete filling of the cavity. It may even be possible to fill the at least one cavity without injecting the resin under pressure; i.e. rather pouring the resin in. Such a substantially vertical position can e.g. be obtained by having the longitudinal axes of the first and second members in a substantially vertical orientation, but these axes may also extend substantially horizontally.

Alternatively, the step of filling resin into the cavity may be performed with the first and second joining surfaces in an inclined orientation different from vertical.

Still another alternative is that resin may be filled into the at least one cavity while the first member is still in the mould during filling—or in an orientation corresponding thereto but with the first member demoulded. Hereby the requirements to the bonding strength between the first and second members before filling the at least one cavity with resin can be lowered.

In an embodiment of the invention, at least one of the at least one resin barrier may be a string of adhesive. Hereby the resin barrier itself can constitute the bonding between the first and the second members. The adhesive may e.g. be applied to the first member whereupon the second member is placed on top thereof.

The adhesive may be a polymer selected from polyurethane, epoxy, vinyl ester, acrylic, polyamide, phenolic, polyurethane and polyester. It may also be relevant to design a material, such as a composite material, particularly suitable for use as resin according to the present invention. It may e.g. be relevant to choose or design a resin material which has a positive influence on the damping properties of the blades. In the choice of resin material it should preferably be ensured that there is no mismatch of elastic properties between the resin material and the surrounding materials to such an extent that it could give rise to stress concentrations during loading of the wind turbine blades. This could e.g. be ensured as part of the design process by experimentation or by computer simulations.

In an alternative embodiment of the invention, at least one of the at least one resin barrier may be a strip of elastically deformable solid material, which may e.g. be a flexible tubing, so that a tight barrier can be obtained even with un-even first and second joining surfaces. Such a strip may e.g. be fastened to the first and second members by an adhesive, a double-sided adhesive tape or staples. An advantage of using strips of solid material instead of strings of adhesive is that the risk of having "kissing bonds" is avoided.

If desired, strings of adhesive can be used in combination with strips of elastically deformable solid material.

In addition to the above mentioned advantages of the present invention, the use of such a strip of a flexible material may, depending on the cross sectional shape of the strip, result in a concave front line surface of the resin being filled into the cavity. Hereby the risk of weaknesses due to possible notches at the interface between the resin and the members being joined is lowered.

Such an elastically deformable solid material may be made from polymer foam, such as closed cell foam. It may e.g. be closed cell polyethylene foam or a foamed nitrile rubber. A material must be chosen which can withstand the curing temperature of the resin, such as temperatures up to 100° C.

In all of the above mentioned embodiments, the resin being filled into the at least one cavity may be a polymer selected from polyurethane, epoxy, vinyl ester, acrylic, polyamide, phenolic, polyurethane and polyester. The resin barrier and the resin may be based on the same type of polymer or on different types. Examples of possible resins are Sika Force 7311, Huntsman RenCast and Gurit Ampreg 21.

In a method according to a preferred embodiment of the invention, the first member is a blade shell, and the second member is a blade spar. In this case the first and second joining surfaces will be an inner surface of the shell and an outer surface of the spar, respectively.

In such an embodiment, the at least one resin barrier may be at least one foam member adapted to fill cavities formed between two blade shell halves and the blade spar after assembly of the blade. Hereby it can be obtained that no significant amount of resin flows into these cavities, even if the adhesion between the resin barrier and a member to be joined is insufficient at some regions.

A second aspect of the invention relates to a wind turbine blade manufactured by a method as described above.

A third aspect of the invention relates to a wind turbine comprising such a wind turbine blade.

The first, second and third aspects of the present invention may be combined. These and other aspects of the invention will be apparent from and elucidated with reference to the embodiments described hereinafter.

BRIEF DESCRIPTION OF THE FIGURES

The method of manufacturing a wind turbine blade according to the present invention will now be described in more detail with regard to the accompanying figures. The figures show one way of implementing the present invention and is not to be construed as being limiting to other possible embodiments falling within the scope of the attached claim set.

FIG. 1 shows schematically a cross sectional view of the adhesive joints between a spar and a shell of a wind turbine blade manufactured according to a known method.

FIG. 2 shows schematically a three-dimensional view of a spar with strings of adhesive applied along the edges of the surface to be joined with the shell.

DETAILED DESCRIPTION OF AN EMBODIMENT

Figure 3:
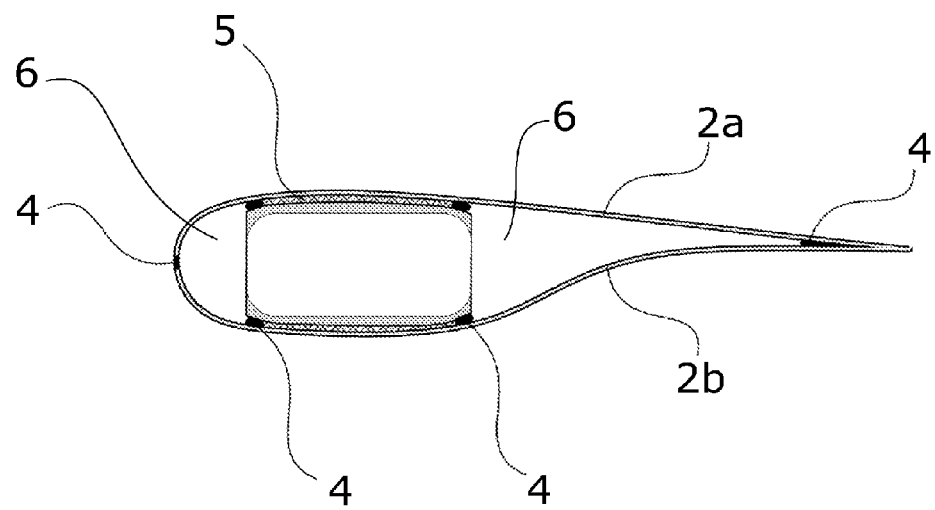
FIG. 3 shows schematically a cross sectional view of the joints between a spar and a shell which have been joined by a method according to the present invention.
Figure 4:
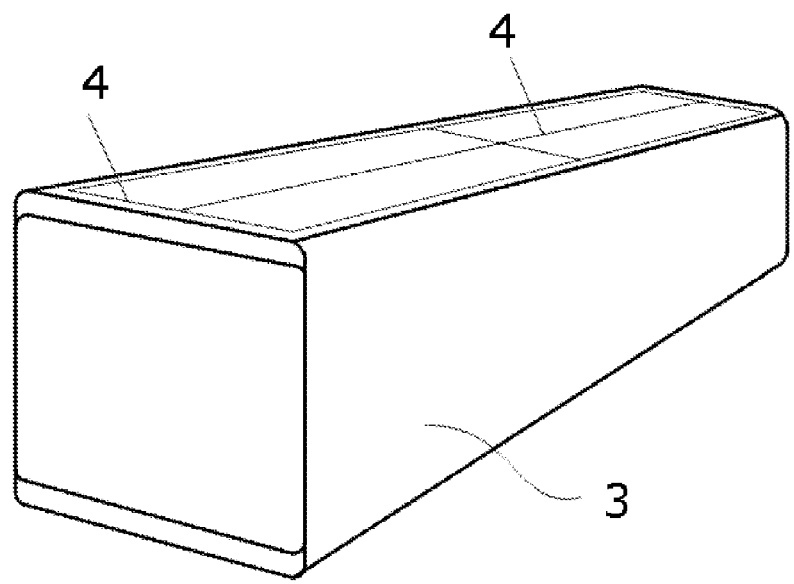
FIG. 4 shows schematically a three-dimensional view of a spar with strings of adhesive applied to form a number of cavities when the spar and blade are joined. These cavities are subsequently filled with resin.

A wind turbine blade 1 may be manufactured in a number of ways, but in the known method shown schematically in FIG. 1, it comprises a shell 2, constituted by two shell halves 2a,2b, and a load-carrying spar 3 located between the two shell halves 2a,2b. The spar 3 and shell 2 are assembled by adhesive 4 as shown schematically in FIG. 1. The adhesive 4, such as a thixotropic PUR adhesive, is typically applied to at least one of the surfaces to be joined as a number of parallel strings so that at least most of the adjoining surfaces are covered with adhesive after assembly. This joining process has a number of drawbacks as described above.

A manufacturing method according to the present invention comprises an alternative way of joining the spar 3 and the two shell halves 2a,2b. The idea is to apply a resin barrier in the form of strings of adhesive 4 along the boundaries of the regions to be joined so that a cavity is established between the adjoining surfaces at assembly, the cavity being delimited by the strings of adhesive 4. The wording "strings", i.e. plural, is used here and in the following, even though the adhesive may be applied as one string by a tool which can change directions, e.g. to form a rectangular shape of the cavity being delimited by the adhesive. As an example, FIG. 2 shows schematically a spar 3 with strings of adhesive 4 applied before assembly with the shell 2. Such strings may be applied to one or both of the surfaces to be joined. The application may be performed by a tool as used in known art, or it may be designed specifically for the method according to the present invention.

Subsequently, resin 5 is filled into the cavity, which resin 5 is typically pumped into the cavity under pressure; this will be described in further detail below. The injection of resin may furthermore be assisted by application of vacuum to the cavity to limit or remove the risk of air being trapped in the resin.

A cross sectional view of the resulting joints is illustrated schematically in FIG. 3. The strings of adhesive 4 act as gaskets for the resin 5, and it should therefore be ensured that they are applied without interruptions or that possible interruptions are subsequently filled with adhesive. This is preferably checked, e.g. by visual inspection, before assembly and possibly also after assembly but before injection of resin, e.g. by ultrasound, to prevent leaking of resin into the space between the two shell halves 2a,2b. The flow of resin during injection may be followed by thermography as a further precaution against the resin flowing outside the cavity. Furthermore such thermography may be used to monitor that the whole cavity is filled.

Any material which can form a satisfactory adhesion to the surfaces to be joined can in principle be used for the adhesive strings 4 and for the resin 5 being filled into the cavity. The adhesive strings 4 may e.g. be made from a material used to join the surfaces in a known method, such as a thixotropic PUR adhesive. The resin 5 may e.g. be a PUR potting material which is known e.g. from potting of electronic components. Such a potting material is typically significantly cheaper than an ordinary PUR adhesive, and since large amounts of material is used for the assembly of a wind turbine blade 1, use of a method according to the present invention can result in decreased material cost. Alternative materials include epoxy, polyamide, vinyl ester, phenolycs, acrylics and polyester. The resin material may be injected at above-room temperature to have a low enough viscosity to ensure a complete filling of the at least one cavity.

The strings of adhesive 4 typically have a width in the order of 5 to 100 mm and a thickness of 0.3 to 30 mm. The thickness should be large enough to ensure that the resin flow through the cavity during injection is not counteracted to a disadvantageous extent by limited passage through the cavity. It may also be advantageous to use different thicknesses of the resin barrier so that it is e.g. made thicker at locations where it is relatively hard to ensure completely matching geometries of the first and second joining surfaces.

The adhesive is typically applied while the shell is still in the mould used during manufacturing thereof, so that the shell is supported in the correct orientation. However, the shell can be removed from the mould before performing the step of filling resin into the at least one cavity. Hereby the manufacturing capacity can be increased compared to known art, because the mould is not occupied for as long time. In some embodiments of the invention, the members are raised to an inclined, such as a substantially vertical, position before injection of resin so that gravity can assist in obtaining a complete and uniform filling of the at least one cavity. In this case the resin can in principle be merely poured into the at least one cavity, or a pressure just above atmospheric pressure can be used. The optimal inclination and pressure for a given geometry and size may be determined e.g. by experimentation or computer simulations as it will depend on parameters such as material, viscosity, and temperature.

When the members are removed from the mould before injecting and curing the resin it must be ensured that the bonding strength between the members is sufficient to ensure a safe handling.

In a slightly alternative manufacturing method, strip(s) of elastically deformable solid material is/are used as resin barrier instead of or in combination with the string(s) of adhesive. Such strips are e.g. fastened to the first and second members by an adhesive, such as a double-sided adhesive tape or staples. The strips fulfill the same function as the strings of adhesive as described above, and the actual choice of resin barrier can e.g. depend on price, ease of application and requirements to the strength, which again depends on whether or not the members are removed from the mould before filling with resin and curing thereof.

Figure 5:
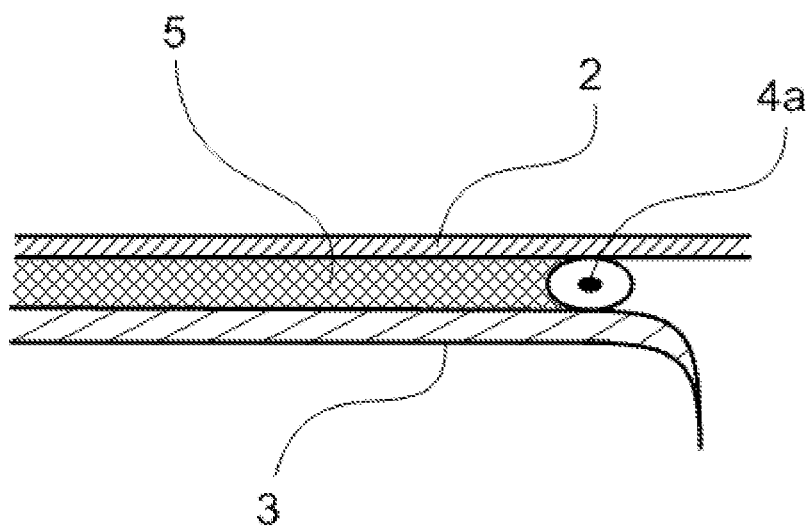
FIG. 5 shows schematically an embodiment of the invention in which a flexible tubing is used as resin barrier.

FIG. 5 shows schematically an embodiment of the invention in which a flexible tubing 4a, such as made from closed cell polymer foam, is used as resin barrier. The section is shown as corresponding to the area around the uppermost right (with respect to the figure) corner of the spar 3 in FIG. 3. The use of such a strip of a flexible material may result in a concave front line surface of the resin 5 being filled into the cavity. Hereby the risk of weaknesses due to possible notches at the interface between the resin 5 and the members 2,3 being joined is lowered. The reason for using a flexible and preferably also compressible material is that it is hereby easier to ensure a tight connection even with slightly uneven surfaces of the members to be joined. Such uneven surfaces may be expected due to the use of composite materials.

In another alternative manufacturing method, foam members (not shown) being shaped to fill up most of the cavities 6 (see FIG. 3) between the shell halves 2a,2b can be used as resin barriers instead of or in combination with the strings of adhesive 4 or the flexible tubing 4a described above. Hereby it may be easier to ensure that only insignificant amounts of resin can flow into these cavities 6. Such possible resin leakage could result in less control of the weight and mechanical properties of the final wind turbine blade.

In all the embodiments described above, the fluid communication between the equipment used to inject the resin and the cavity can be established by drilling one or more inlet holes (not shown) in the shell and inserting or attaching, such as by gluing, a suitable connector (not shown). Further details of the establishment of such a connection will be well-known to a person skilled in the art. When the filling process has ended, the inlet holes are covered, typically by application of laminates of a composite material of the same composition as the remainder of the shell, before the blade is painted.

A larger number of resin barriers 4,4a may be applied lengthwise and/or crosswise (with respect to the length direction of the blade 1) so that more cavities are formed. Hereby the resin 5 can be injected from more points simultaneously whereby the manufacturing time can be lowered. Furthermore it may be easier to ensure a complete filling of a smaller cavity, and more than one cavity may therefore be desired even if only one resin injection equipment is used. What is considered an optimal number of cavities also depends on the pumping capacity of the resin injection equipment and the time it takes to connect and disconnect the equipment to and from the blade and seal the inlet holes afterwards.

Figure 6:
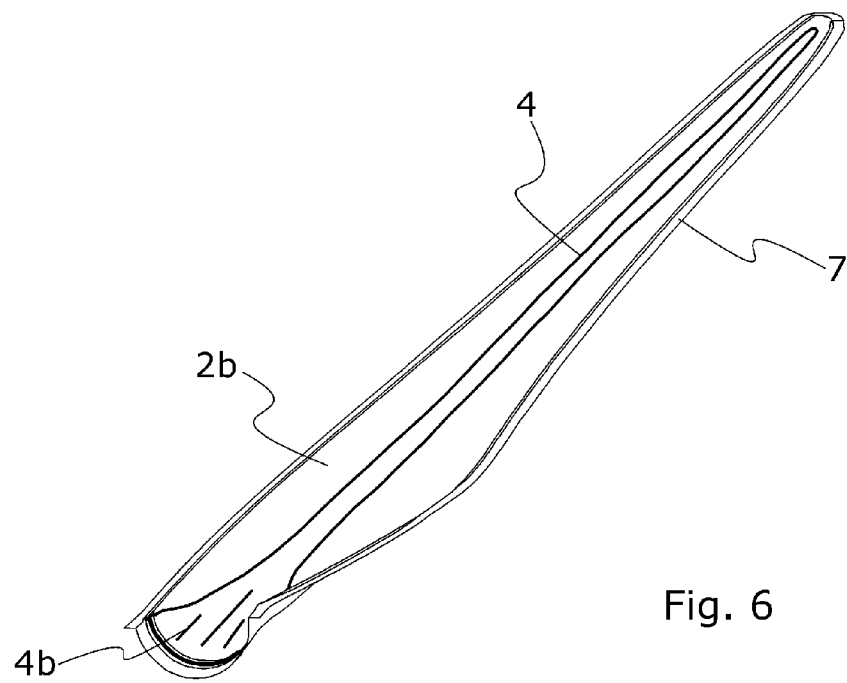
FIG. 6 shows schematically a wind turbine blade shell half to which strings of adhesive has been applied.
Figure 7:
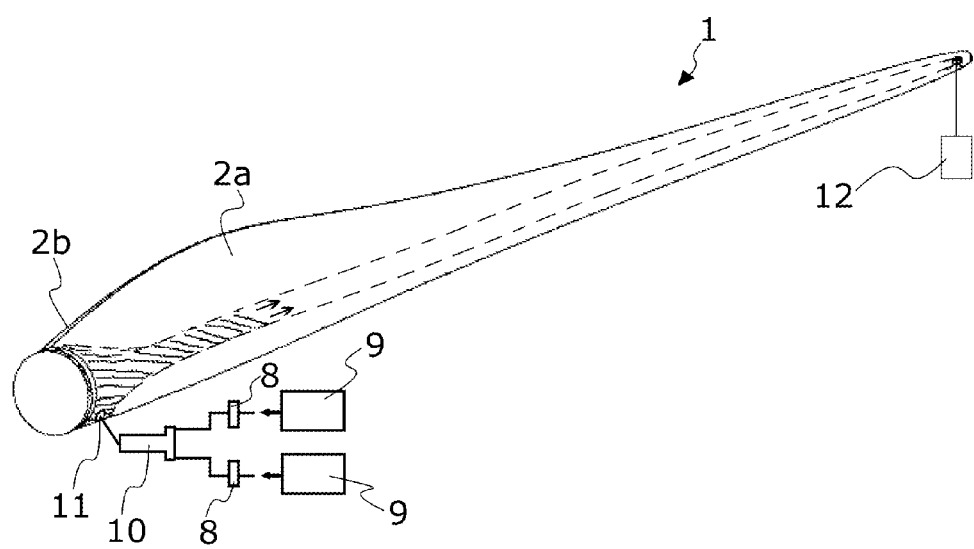
FIG. 7 shows schematically an assembled wind turbine blade having resin injected at one end of the cavity.

An example of the manufacturing of a wind turbine blade 1 by a method according to the present invention is shown schematically in FIGS. 6 and 7. In FIG. 6, a blade shell half 2b is still in the mould 7 in which it was manufactured. Strings of adhesive 4 has been applied having a shape matching the blade spar (not shown in these figures) to be inserted between the to blade shell halves 2a,2b to form the whole blade 1. In the figure only one cavity is to be formed, and in addition three further strings of adhesive 4b are applied close to the root end. These further strings of adhesive 4b are applied to increase the handling stability and ensure that the blade spar stays in place during subsequent injection of resin. Shortly after application of of the adhesive string 4, the blade spar is placed in the blade shell half 2b, and the other blade shell half 2a is placed on top thereof. The adhesive string 4 between the blade spar and the upper (with respect to the figure) blade shell half 2a can be applied either to the blade spar or to the blade shell. Alternatively, adhesive strings 4 can be applied to all of the joining surfaces to be joined.

FIG. 7 shows schematically an assembled wind turbine blade having resin injected at one end of the cavity formed between the first and second joining surfaces. The resin 5 and the hardener are pumped by pumps 8 from respective containers 9 to a mixing unit 10 by any suitable equipment which will be well known to a person skilled in the art. From here it is led into the cavity via a tube connected thereto via a connector 11 inserted in a hole drilled in the blade shell half 2a. The flow of resin progresses along the cavity, and any overflow at the other end is led to a discharge container 12. The advancement of the flowfront may be followed with thermography if desired. FIG. 7 shows the filling of the cavity on one side of the blade 1 only. The cavities on both sides can be filled at the same time or one at a time. If both are filled at the same time, the same pumping equipment and supply of resin and hardener can be used for both sides if desired. It is also possible to fill the lower (with respect to the figure) cavity before arranging the second blade shell half 2a on the blade spar.

Although the present invention has been described in connection with the specified embodiments, it should not be construed as being in any way limited to the presented examples. The description is focused on assembly of the shell and the spar of a wind turbine blade, but the method may also be used to join other members of a wind turbine blade. An example could be the joining of a tip end and a root end of a wind turbine blade manufactured as two sections e.g. to ease the transportation of large blades.

The above description has focused on using a method according to the present invention to join the first and second joining surfaces across the whole areas to be joined. An alternative which is also covered by the invention is to use the joining method only over a part of the surfaces to be joined. The method as described could e.g. be used along approximately the third of the length of a wind turbine blade closest to the root end in combination with the rest of the assembly being made by a traditional method. The part of a blade closest to the root end is where the geometry is typically most complex so that the risk of weaknesses due to undesired geometry variations is largest. At the same time the bending moments are typically largest at that end, so that potential weaknesses are more likely to cause instabilities than closer to the tip end.

The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of manufacturing a wind turbine blade having a first member with a first joining surface and a second member with a second joining surface, the first and second joining surfaces being adapted to be joined together, the method comprising:

applying at least one resin barrier to the first joining surface and/or to the second joining surface, wherein at least one of the at least one resin barrier is a string of adhesive so that the resin barrier itself forms a bond between the first and the second members, the string of adhesive being formed solely of adhesive, subsequently locating the first and the second members adjacent each other whereby they are joined by the at least one resin barrier, and so that at least one cavity is formed between the first and second joining surfaces, which at least one cavity is delimited by the at least one resin barrier, subsequently filling resin into the at least one cavity, and curing the resin.

2. The method according to claim 1, wherein the step of filling resin into the at least one cavity comprises injecting liquid resin.

3. The method according to claim 1, wherein the at least one resin barrier is applied so that one cavity is formed.

4. The method according to claim 1, wherein the at least one resin barrier is applied so that a plurality of cavities is formed.

5. The method according to claim 4, wherein the resin is filled into the plurality of cavities concurrently.

6. The method according to claim 1, wherein the steps of applying at least one resin barrier and locating the first and the second members adjacent each other are performed while the first member is still in a mould used during manufacturing of the first member, and wherein the first member is removed from the mould before performing the step of filling resin into the at least one cavity.

7. The method according to claim 6, wherein the step of filling resin into the at least one cavity is performed with the first and second joining surfaces in a substantially vertical position.

8. The method according to claim 1, wherein the adhesive is a polymer selected from polyurethane, epoxy, vinyl ester, acrylic, polyamide, phenolic, polyurethane and polyester.

9. The method according to claim 1, wherein the resin is a polymer selected from polyurethane, epoxy, vinyl ester, acrylic, polyamide, phenolic, polyurethane and polyester.

10. The method according to claim 1, wherein the first member is a blade shell half, and the second member is a blade spar.

* * * * *